(12) United States Patent
Inotsuka et al.

(10) Patent No.: US 8,237,432 B2
(45) Date of Patent: Aug. 7, 2012

(54) ROTATION ANGLE SENSOR

(75) Inventors: Tetsuya Inotsuka, Tokyo (JP); Masanori Endo, Tokyo (JP)

(73) Assignee: Niles Co., Ltd., Tokyo (JP)

( * ) Notice: Subject to any disclaimer, the term of this patent is extended or adjusted under 35 U.S.C. 154(b) by 470 days.

(21) Appl. No.: 12/457,920

(22) Filed: Jun. 25, 2009

(65) Prior Publication Data
US 2010/0001721 A1   Jan. 7, 2010

(30) Foreign Application Priority Data

Jul. 1, 2008  (JP) ................................. 2008-172755

(51) Int. Cl.
*G01B 7/30* (2006.01)

(52) U.S. Cl. ........... 324/207.25; 324/207.2; 324/207.22; 324/207.23; 324/207.24

(58) Field of Classification Search .............. 324/207.25
See application file for complete search history.

(56) References Cited

U.S. PATENT DOCUMENTS

| | | | | |
|---|---|---|---|---|
| 3,101,422 A | * | 8/1963 | Church et al. .................. 310/26 |
| 6,784,661 B2 | * | 8/2004 | Okuma et al. ............ 324/207.25 |
| 7,049,807 B2 | * | 5/2006 | Okuma et al. ............ 324/207.25 |
| 2006/0158180 A1 | * | 7/2006 | Sato ......................... 324/207.25 |

FOREIGN PATENT DOCUMENTS

| | | |
|---|---|---|
| JP | 2003-194580 | 7/2003 |
| JP | 2003194580 A * | 7/2003 |

* cited by examiner

*Primary Examiner* — Patrick Assouad
*Assistant Examiner* — Son Le
(74) *Attorney, Agent, or Firm* — Rader Fishman & Grauer, PLLC

(57) ABSTRACT

A rotation angle sensor providing excellent output characteristics is provided. The rotation angle sensor has a structure in which a ring-shaped permanent magnet provided so as to be rotatable integrally with a rotor connected to a member to be detected; magnetic flux gathering yokes surrounding the outer circumferential surface of the ring-shaped permanent magnet with a certain clearance being formed between the outer circumferential surface and the magnetic flux gathering yokes; and Hall ICs 30 arranged in gaps between the magnetic flux gathering yokes, are arranged inside a casing formed by a casing body and a cover. In the casing body, a guide tube surrounding the outer circumferential surface of the ring-shaped permanent magnet is formed with a certain clearance being formed between the outer circumferential surface and the guide tube. The guide tube is made of a material having a linear expansion coefficient smaller than that of the casing, and the magnetic flux gathering yokes are fixed to the outer circumferential surface of the guide tube.

10 Claims, 7 Drawing Sheets

(A)

(B)

(A)

(B)

(A)

(B)

(A)

(B)

(A)  (B)

ROTATION ANGLE SENSOR

BACKGROUND OF THE INVENTION

1. Field of the Invention

The present invention relates to a rotation angle sensor using a magnetic sensitive element.

2. Description of the Related Art

A rotation angle sensor using a magnetic sensitive element is used as a rotation angle sensor that can be configured small in size and has no fear of causing contact defect due to a foreign matter, thereby suitable for detecting, for example, a depressing angle of an accelerator pedal or a rotation angle of a shaft rotatable in accordance with an operation of the shift lever for a vehicle. A conventional example of such a rotation angle sensor is disclosed, for example, in Japanese Patent Application Laid-open No. 2003-194580.

FIG. 7A is a cross-sectional view illustrating a rotation angle sensor 100 according to the conventional example of the aforementioned Patent Document, and FIG. 7B is a schematic view illustrating the positional relationship among major constituents of the rotation angle sensor 100 illustrated in FIG. 7A, seen from the axis direction of a rotating shaft 101 of the sensor 100. The rotation angle sensor 100 includes a rotating shaft 101 rotating together with a member to be detected, rotation angle of which is a detection object, a ring-shaped permanent magnet 102 fixed to the outer circumferential surface of the rotating shaft 101, yokes 103 surrounding the outer circumferential surface 102a of the permanent magnet 102 with a certain clearance D being formed between the outer circumferential surface 102a and the yokes 103, and a Hall IC 104 arranged in a gap between the yokes 103. The rotation angle sensor 100 detects a rotation angle of the member to be detected based on a change in a magnetic field, occurring due to the permanent magnet 102 when the rotating shaft 101 is rotated, detected by the Hall IC 104. In the rotation angle sensor 100, the yokes 103 are arranged in a state of being embedded in a housing 105 made of a resin material.

DISCLOSURE OF THE INVENTION

Problem to be Solved by the Invention

The rotation angle sensor is used in environments, temperature of which varies over a wide range from extremely low temperature to high temperature. In general, the housing 105 is made of a resin material having a large linear expansion coefficient, thereby the housing expanding or contracting in accordance with the environmental temperature under which the rotation angle sensor is used. For example, when the housing 105 expands and moves outwards in the radial direction, the yokes 103 embedded in the housing 105 also move outwards in the same direction, expanding the gap G (see FIG. 7B) between the yokes 103. On the other hand, when the housing 105 contracts and moves inwards in the radial direction, the yokes 103 also move inwards in the same direction, narrowing the gap G between the yokes 103.

As stated above, when the housing 105 expands or contracts in accordance with temperature, there occurs a positional displacement of the yokes 103, varying the gap G between the yokes 103. Therefore, there has been a problem that output characteristics of the Hall IC 104 arranged in the gap G are deteriorated because a variation occur in values detected by the Hall IC 104.

SUMMARY OF THE INVENTION

In view of the foregoing situations, the present invention has an object of providing a rotation angle sensor capable of providing excellent output characteristics.

Means for Solving the Problem

The present invention relates to a rotation angle sensor in which a ring-shaped permanent magnet provided so as to be rotatable integrally with a member to be detected, ring-shaped yokes surrounding the outer circumferential surface of the ring-shaped permanent magnet with a certain clearance being formed between the magnet and the yokes, and a magnetic sensitive element arranged in a gap formed between the ring-shaped yokes, are arranged inside a casing. In the casing, a tube-shaped wall surrounding the outer circumferential surface of the ring-shaped permanent magnet, is formed. The tube-shaped wall is made of a material having a linear expansion coefficient smaller than that of the casing, and the ring-shaped yokes are fixed to the outer circumferential surface of the tube-shaped wall.

Advantageous Effects of the Invention

According to the present invention, the extent of the expansion or the contraction of the tube-shaped wall to which the ring-shaped yokes are fixed, occurring due to temperature, is smaller than that of the casing of the rotation angle sensor, because the tube-shaped wall is made of a material having a linear expansion coefficient smaller than that of the casing. Therefore, an amount of movement of the ring-shaped yokes fixed to the outer circumferential surface of the tube-shaped wall, occurring due to the expansion or the contraction of the tube-shaped wall, is small. Hence, because variation in the gap between the ring-shaped yokes is also smaller than that of the conventional example, variation in outputs of the magnetic sensitive element, occurring due to temperature, can be suppressed, allowing the output characteristics thereof to be improved.

DESCRIPTION OF THE PREFERRED EMBODIMENTS

Figure 1:
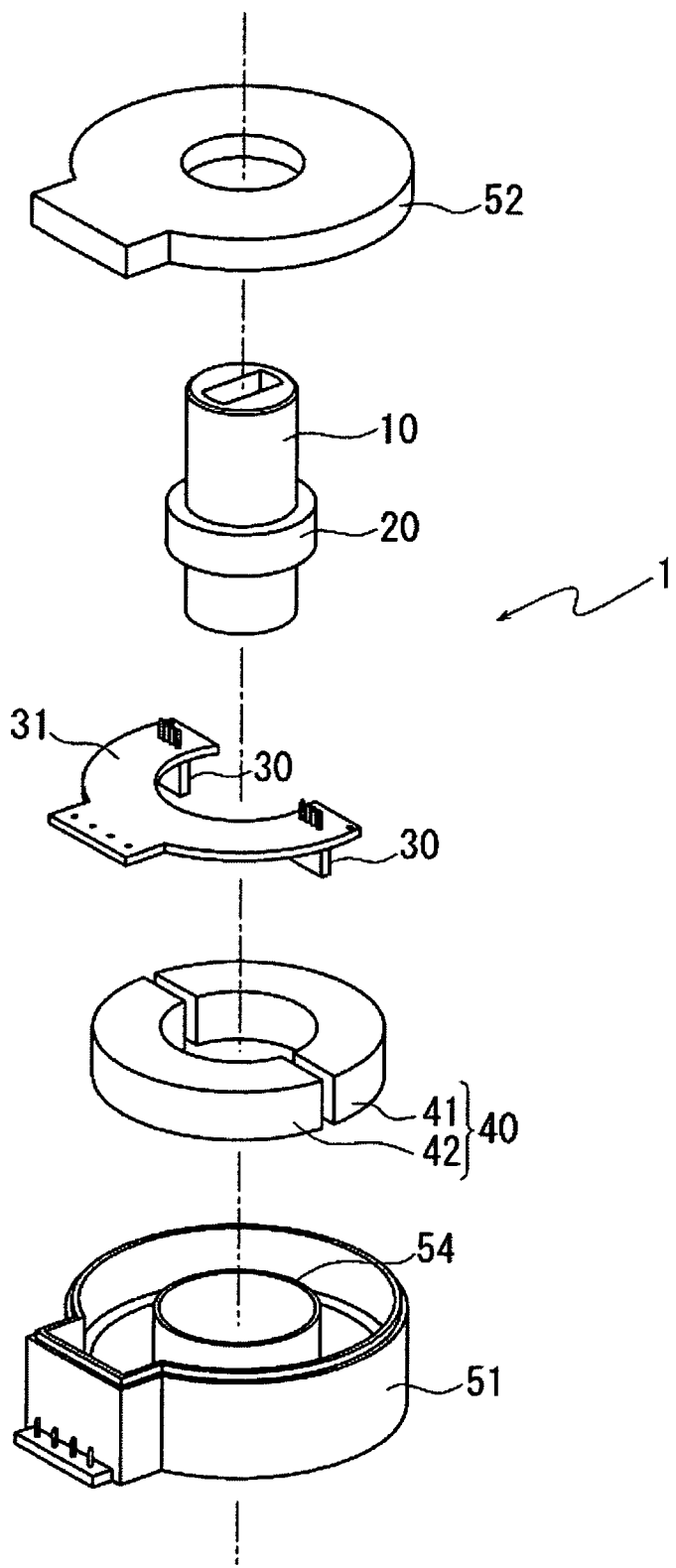
FIG. 1 is an exploded perspective view illustrating a contactless rotation angle sensor according to an embodiment.
Figure 2:
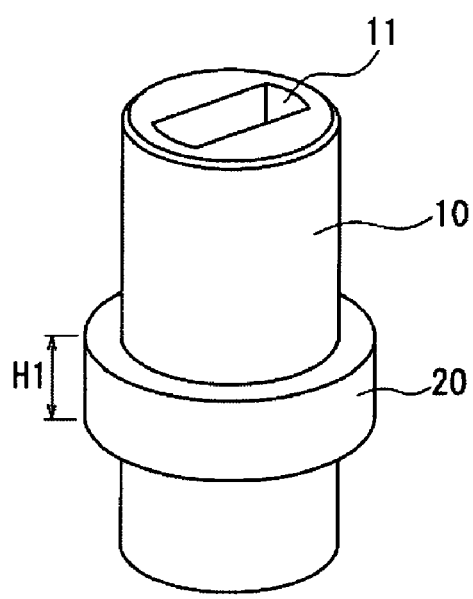
FIGS. 2A and 2B are views illustrating a rotor and a ring-shaped permanent magnet of the rotation angle sensor.
Figure 2:
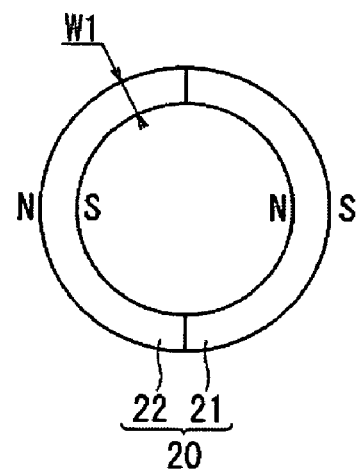
Figure 3:
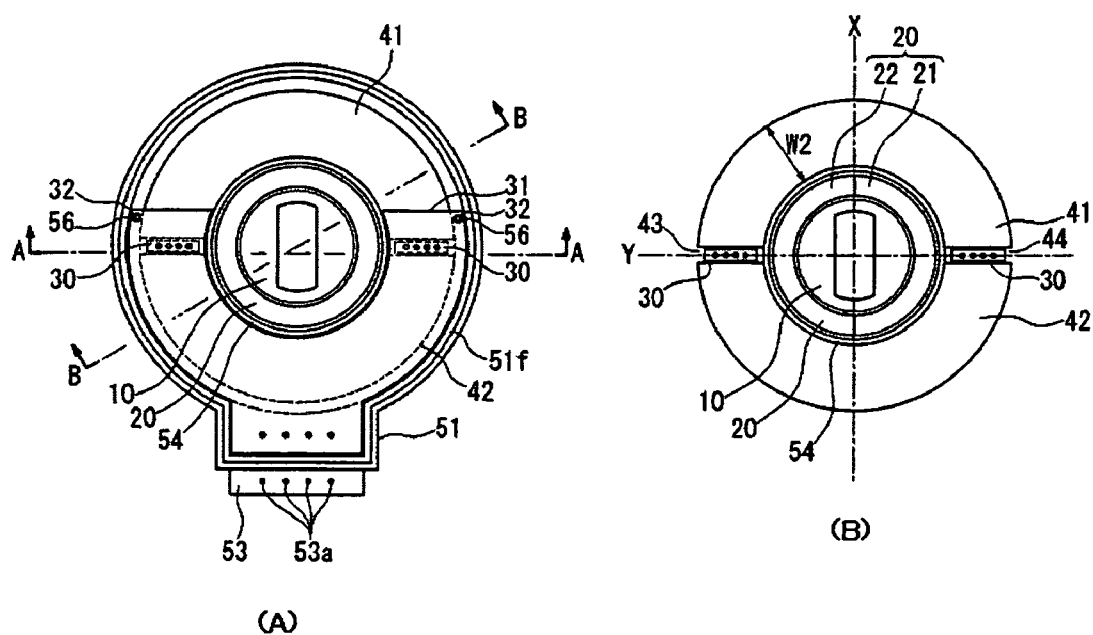
FIGS. 3A and 3B are views illustrating the contactless rotation angle sensor according to the embodiment.
Figure 4:
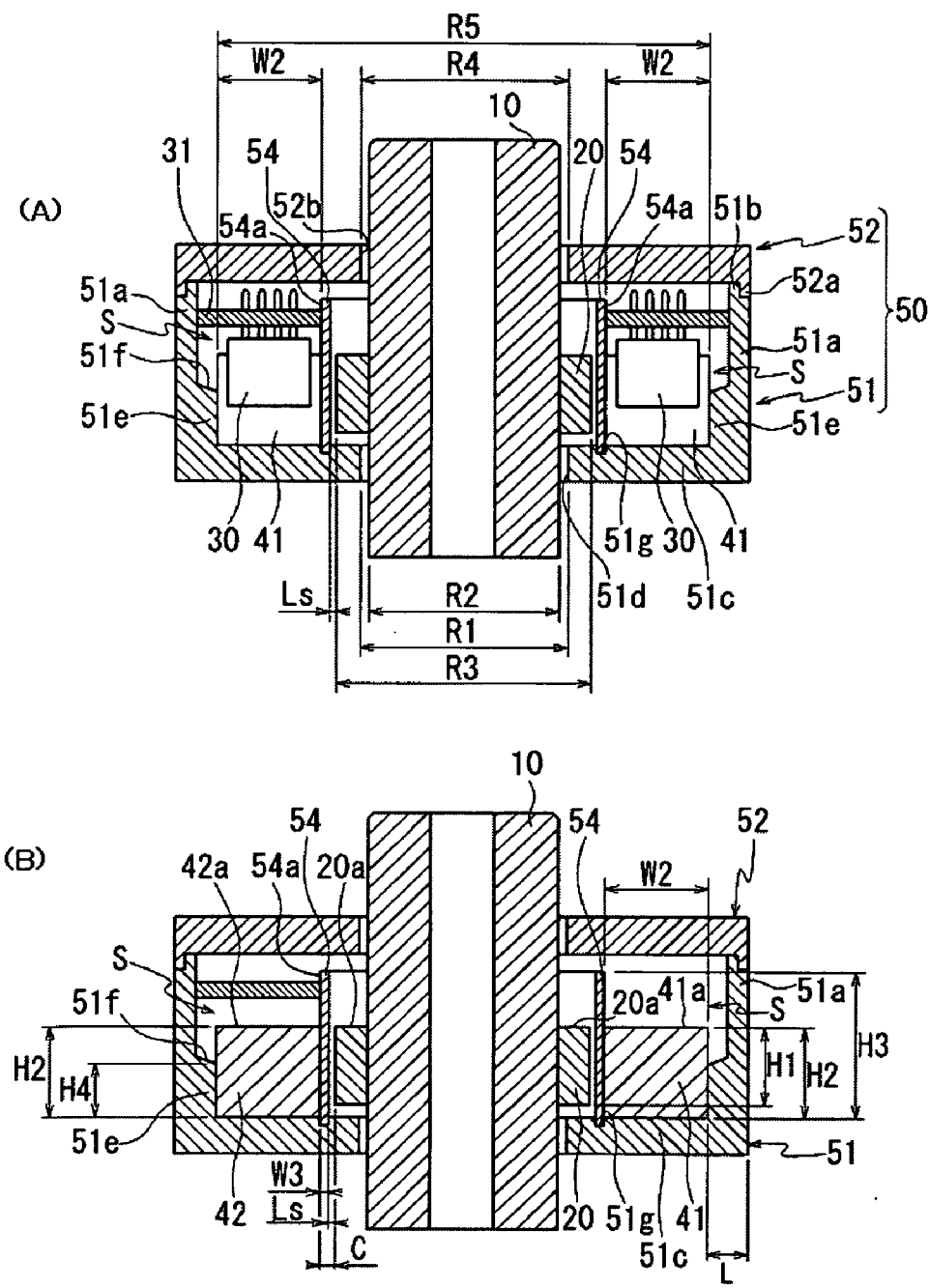
FIGS. 4A and 4B are views illustrating the contactless rotation angle sensor according to the embodiment.

Hereinbelow, embodiments of the present invention will be described with respect to the case where the rotation angle sensor is used in detecting a rotation angle of the aforementioned shaft. FIG. 1 is an exploded perspective view illustrating a rotation angle sensor according to an embodiment;

FIGS. 2A and 2B are views illustrating a rotor and a ring-shaped permanent magnet fixed to the outer circumferential surface of the rotor; FIG. 3A is a plan view of the rotation angle sensor seen from the axial direction, and FIG. 3B is a schematic view illustrating the positional relationship among major constituents of the rotation angle sensor illustrated in FIG. 3A; and FIG. 4A is a cross-sectional view taken along line A-A of FIG. 3A, and FIG. 4B is a cross-sectional view taken along line B-B of FIG. 3A.

As illustrated in FIG. 1, the rotation angle sensor 1 includes the rotor 10, the ring-shaped permanent magnet 20, a Hall IC 30, and magnetic flux gathering yokes 41 and 42 (hereinafter, when not particularly distinguishing one from another, both of them are denoted by "magnetic flux gathering yokes 40"). The ring-shaped permanent magnet 20, the magnetic flux gathering yokes 40 and the Hall IC 30 are arranged inside the casing formed by a casing body 51 and a cover 52.

As illustrated in FIGS. 2A and 2B, the rotor 10 has a cylindrical shape and is fixed to a rotating member (shaft), which is a detection object, for example, a manual shaft of a transmission. The rotor 10 has a through hole 11 for inserting the shaft therethrough and the cross-section of the through hole 11 has a two-face width portion matching the cross section of a shaft portion to be fixed, allowing the rotor 10 to rotate integrally with the shaft in a state where the shaft portion to be fixed is inserted through the rotor.

The ring-shaped permanent magnet 20 uses, for example, an isotropic, neodymium bond magnet (molding neodymium, iron, and boron powder with a PPS resin), and is fixed to the outer circumferential surface of the rotor 10 without a clearance. The height H1 in the axial direction and the thickness W1 in the radial direction of the ring-shaped permanent magnet 20 are identical over its whole circumference, respectively.

As illustrated in FIG. 2B, the ring-shaped permanent magnet 20 is divided half by a diametrical line seen from the axial direction (180° positions in the circumferential direction). The two semicircle portions are magnetized in parallel with respect to a single diametrical line such that a magnetic semicircle portion 21 defines an inner circumferential side (the side in contact with the rotor 10) as N pole and an outer circumferential side as S pole, while the other magnetic semicircle portion 22 defines an inner circumferential side as S pole and an outer circumferential side as N pole; and as a whole, the ring-shaped permanent magnet 20 has a two-pole structure having N and S in the circumferential direction, seen from one radial direction.

As illustrated in FIGS. 4A and 4B, the rotor 10 is arranged such that the rotor 10 penetrate the casing 50 formed by the casing body 51 and the cover 52 in the thickness direction, and the ring-shaped permanent magnet 20 fixed to its outer circumferential surface is located inside the casing 50. The casing 50 is made of a non-magnetic material such as a resin (plastic) material, and supported by a member (not illustrated) to be a stationary member with respect to the rotating member, which is a detection object. In the present embodiment, the casing 50 is made of polyamide (linear expansion coefficient: 4 to $7 \times 10^{-5}/°$ C. [average: $5.5 \times 10^{-5}/°$ C.]), in the same way as the housing 105 of the rotation angle sensor according to the conventional example.

As illustrated in FIG. 3A, a connecting portion 53 where terminals 53a are exposed is formed on the side surface of the casing body 51. Each of the terminals 53a is connected to the Hall IC 30 through a wire interconnecting the casing body 51 and a substrate 31 to which the Hall IC 30 is fixed, allowing an output signal from the Hall IC 30 to be outputted outside.

As illustrated in FIG. 4A, an inlay portion 51b is formed at the upper edge on the the cover 52 side of an outer circumferential wall 51a of the casing body 51 such that the inlay portion 51b is fitted in a fitting wall 52a provided over the whole circumference along the periphery of the cover 52, allowing the casing body 51 and the cover 52 to be combined together.

An opening 51d for inserting the rotor 10 is formed in a bottom portion 51c of the casing body 51, and the diameter R1 of the opening 51d is set to be larger than the diameter R2 of the rotor 10 and smaller than the diameter R3 of the ring-shaped permanent magnet 20. An opening 52b for inserting the rotor 10 is also formed in the cover 52, and the diameter R4 of the opening 52b is the same as the diameter R1 of the opening 51d in the casing body 51.

Further, a cylinder-shaped guide tube 54 is formed on the bottom portion 51c of the casing body 51, at a position spaced apart from the edge of the opening 51d, so that the guide tube 54 surrounds the outer circumferential surface of the ring-shaped permanent magnet 20 arranged inside the casing 50, with a certain clearance Ls being formed from the outer circumferential surface. A groove 51g having a shape matching the guide tube 54 seen from the axial direction is formed in the bottom portion 51c of the casing body 51 such that the lower edge of the guide tube 54 is inserted into the grove 51g so as to be fixed to the casing body 51.

As illustrated in FIG. 4B, the height H3 in the axial direction of the guide tube 54 is set to be higher than the height H2 in the axial direction of the magnetic flux gathering yokes 40 (41, 42), while the thickness W3 in the radial direction thereof is formed so as to be identical over the whole circumference. The guide tube 54 is made of a resin material having a linear expansion coefficient smaller than that of the resin material forming the casing 50, and having a higher stiffness than that of the above material. Such resin materials include, for example, polyphenylene sulfide (PPS) (linear expansion coefficient: 2 to $4 \times 10^{-5}/°$ C. [average: $3.0 \times 10^{-5}/°$ C.]) and polyether ether ketone (PEEK) (linear expansion coefficient: 2 to $5 \times 10^{-5}/°$ C. [average: $3.5 \times 10^{-5}/°$ C.]).

When the guide tube 54 is made of a material, the linear expansion coefficient of which is smaller than that of the casing 50, the extent of the expansion or the contraction of the guide tube 54 is smaller than that of the casing 50, even when the casing 50 expands or contracts due to heat. Thereby, an amount of movement of the magnetic flux gathering yokes 40 fixed to the outer circumferential surface 54a of the guide tube 54, occurring in accordance with the expansion or the contraction of the guide tube 54, is small; and hence movement (positional displacement) of the magnetic flux gathering yokes 40, occurring due to temperature, is suppressed, allowing variation in the gaps 43 and 44 between the magnetic flux gathering yokes 40, occurring with the movement of the magnetic flux gathering yokes 40, to be suppressed. A description with respect to the stiffness will be made below.

As illustrated in FIG. 3B, the magnetic flux gathering yokes 41 and 42 respectively have semicircle shapes that are identical to each other, seen from the axial direction. Each of the magnetic flux gathering yokes 41 and 42 are made of a steel material. The magnetic flux gathering yokes 41 and 42 are obtained by dividing a ring-shaped magnetic flux gathering yoke having a certain width W2 seen from the axial direction into two pieces by a diametrical line (180° positions in the circumferential direction). The gaps 43 and 44 are formed by cutting off circumferentially opposing faces between the two semicircle portions obtained by the division.

The magnetic flux gathering yokes 41 and 42 are fixed to the outer circumferential surface 54a of the guide tube 54 without a clearance, and arranged inside a space S formed between the outer circumferential wall 51a and the guide tube 54, as illustrated in FIG. 4B. In this case, the magnetic flux gathering yokes 41 and 42 are fixed to the outer circumferential surface 54a of the guide tube 54 such that the upper surface 20a on the cover 52 side of the ring-shaped permanent magnet 20, which is arranged inside the casing 50, and the upper surfaces 41a and 42a on the cover 52 side of the magnetic flux gathering yokes 41 and 42 are disposed at the identical height.

The height H2 in the axial direction of the magnetic flux gathering yokes 41 and 42 is set to be higher than the height H1 in the axial direction of the ring-shaped permanent magnet 20 (H1<H2), so that the ring-shaped permanent magnet 20 is fitted in the range of the height H2 of the magnetic flux gathering yokes 41 and 42, seen from the radial direction.

Further, the height H2 in the axial direction of the magnetic flux gathering yokes 41 and 42 is set to be optimal based on results of experimental measurements, and the lower surface on the bottom portion 51c side and the upper surface on the cover 52 side of the magnetic flux gathering yokes 41 and 42, form a vertical flat surface with respect to the axial direction.

The width W2 of the magnetic flux gathering yokes 41 and 42, seen from the axial direction, is designed to be identical over its whole circumference such that a magnetic flux is not saturated inside the magnetic flux gathering yokes 41 and 42 in consideration of a magnetic permeability of a material forming the magnetic flux gathering yokes and a magnetic flux density of the ring-shaped permanent magnet 20.

As illustrated in FIG. 4A, a diameter-reduced portion 51e is formed over the whole circumference on the inner circumferential surface on the bottom portion 51c side of the outer circumferential wall 51a of the casing body 51. Herein, a spaced distance between the diameter-reduced portion 51e and the outer circumferential surface 54a of the guide tube 54 is set to be slightly narrower than the width W2 of the magnetic flux gathering yokes 40 (41, 42) such that the magnetic flux gathering yokes 40 are light press fitted and arranged between the guide tube 54 and the diameter-reduced portion 51e. Therefore, an inner diameter R5 of the diameter-reduced portion 51e is set such that the spaced distance between the diameter-reduced portion 51e and the guide tube 54 has a length slightly narrower than the width W2 of the magnetic flux gathering yokes 40 (41, 42).

As illustrated in FIG. 4B, when the magnetic flux gathering yokes 40 have been light press fitted, the magnetic flux gathering yokes 40 are biased toward the guide tube 54 side by the diameter-reduced portion 51e, because the thickness L in the radial direction of the diameter-reduced portion 51e is larger than the thickness Ls in the radial direction of the guide tube 54. Thereby, the magnetic flux gathering yokes 40 are fixed to the outer circumferential surface 54a of the guide tube 54 without a clearance in a state of being always pressed against the guide tube 54. Thereby, the spaced distance C between the ring-shaped permanent magnet 20 and the magnetic flux gathering yokes 40 can be constant over the whole circumferential direction and an amount of magnetic fluxes turning into the magnetic flux gathering yokes 40 can be stabilized, allowing the rotation angle sensor 1 to provide excellent output characteristics.

Further, when the casing body 51 contracts, there is no fear that a clearance may instantly occur between the magnetic flux gathering yokes 40 and the guide tube 54 because there is a margin in a contraction allowance of the diameter-reduced portion 51e as much as the magnetic flux gathering yokes 40 are light press fitted. On the other hand, when the casing 50 expands, although the magnetic flux gathering yokes 40 are biased toward the guide tube 54 side by a stronger force from the expanded diameter-reduced portion 51e, there is no fear that the spaced distance C between the ring-shaped permanent magnet 20 and the magnetic flux gathering yokes 40 may be drastically varied due to deformation of the guide tube 54, because the guide tube 54 is made of a resin material having a high stiffness such as PPS and PEEK, as described above.

If the thickness W3 of the guide tube 54 is simply made thin, the tube 54 is deteriorated in durability because the tube 54 is always subjected to stress from the magnetic flux gathering yokes 40. However, if the guide tube 54 is made of a resin material having a high stiffness, the thickness W3 can be made thin within the range where the durability thereof is not impaired. Accordingly, the spaced distance C between the ring-shaped permanent magnet 20 and the magnetic flux gathering yokes 40 can be made thin as far as the thickness W3 is made thin, and therefore an amount of magnetic fluxes turning into the magnetic flux gathering yokes 40 can be increased with diffusion of the magnetic fluxes being prevented, allowing the rotation angle sensor 1 to be improved in its output characteristics and to be miniaturized.

As illustrated in FIG. 4B, the height H4 on the inner circumferential side of the diameter-reduced portion 51e is set to be lower than the height H2 of the magnetic flux gathering yokes 40 (41, 42) such that resistance occurring when the yokes 41 and 42 are light press fitted, and a stress the diameter-reduced portion 51e is subjected by the yokes 41 and 42 thus light press fitted, are adjusted by adjusting a contact area between the diameter-reduced portion 51e and the yokes 41 and 42. Further, the upper edge on the cover 52 side of the diameter-reduced portion 51e is designed to have a tapered surface 51f, the height on the inner diameter side of which is lower than that on the outer diameter side thereof, so that the diameter-reduced portion 51e serves as a guide when the magnetic flux gathering yokes 41 and 42 are light press fitted.

As illustrated in FIG. 3B, linear output Hall ICs 30, which are magnetic sensitive elements, are arranged in the gaps 43 and 44 between the magnetic flux gathering yokes 41 and 42. The Hall IC 30 outputs a signal in accordance with an amount of magnetic fluxes passing therethrough.

As illustrated in FIG. 3A, the substrate 31 has a shape capable of being fitted outside the outer circumferential surface 54a of the guide tube 54 and has locating holes 32 formed therein. The locating holes 32 are designed such that the Hall ICs 30 fixed to the substrate 31 are accurately located in the gaps 43 and 44 between the magnetic flux gathering yokes 41 and 42 by being penetrated with locating bosses 56 formed on the casing body 51, when mounting the substrate 31 to the casing body 51.

In the rotation angle sensor 1 having such a structure, the magnetic flux generated by the ring-shaped permanent magnet 20 passes through the magnetic flux gathering yokes 40 (41, 42). Herein, when the ring-shaped permanent magnet 20 rotates together with the rotor 10, a ratio of an amount of magnetic fluxes passing through the gaps 43 and 44 where the Hall ICs 30 are arranged to an amount of magnetic fluxes not passing through the gaps 43 and 44, varies and the Hall ICs 30 output different detected values in accordance with rotation angles of the ring-shaped permanent magnet 20. Therefore, because the rotation angle of the ring-shaped permanent magnet 20 can be determined based on a value detected by the Hall IC 30, a rotation angle of the member to be detected (rotor 10) can be specified. Herein, because the magnetic flux gathering yokes 40 are fixed to the outer circumferential surface 54a of the guide tube 54 made of a material having a linear expansion coefficient smaller than that of the casing 50, the extent of the expansion or the contraction of the guide tube 54 is small when the casing 50 expands or contracts due to heat; and therefore an amount of movement of the yokes 40, occurring in accordance with the expansion or the contraction of the guide tube 54, is also small. Thereby, movement of the magnetic flux gathering yokes 40 due to temperature and variation in the gaps 43 and 44 of the yokes 40, associated with the aforementioned movement, can be suppressed as compared to the case where the magnetic flux gathering yokes 40 are embedded in the casing.

Herein, the magnetic flux gathering yokes 40 (41, 42) in the embodiment corresponds to the ring-shaped yoke in the present invention, the Hall IC 30 to the magnetic sensitive element, and the guide tube 54 to the tube-shaped wall.

As stated above, the rotation angle sensor 1 according to the embodiment is a rotation angle sensor 1 in which the ring-shaped permanent magnet 20 provided so as to be rotatable integrally with the rotor 10 connected to the member to be detected, the magnetic flux gathering yokes 40 (41, 42) surrounding the outer circumferential surface of the ring-shaped permanent magnet 20 with a certain clearance being formed between the outer circumferential surface and the yokes 40, and the Hall ICs 30 arranged in the gaps 43 and 44 between the magnetic flux gathering yokes 40, are arranged inside the casing 50 formed by the casing body 51 and the cover 52. In the casing body 51, the guide tube 54 surrounding the outer circumferential surface of the ring-shaped permanent magnet 20, with a certain clearance Ls being formed, is provided. The guide tube 54 is made of a material having a linear expansion coefficient smaller than that of the casing 50, and the magnetic flux gathering yokes 40 are fixed to the outer circumferential surface 54a of the guide tube 54. With this structure, the extent of the expansion or the contraction of the guide tube 54, occurring due to temperature, is smaller than that of the casing 50, because the guide tube 54 is made of a material having a linear expansion coefficient smaller than that of the casing 50. Consequently, an amount of movement of the magnetic flux gathering yokes 40 fixed to the outer circumferential surface 54a of the guide tube 54, occurring in accordance with the expansion or the contraction of the guide tube 54, is also small. Thereby, movement of the magnetic flux gathering yokes 40, occurring due to temperature, and variation in the gaps 43 and 44 between the yokes 40, occurring associated with the movement of the yokes, are suppressed and small as compared to the convention example in which the magnetic flux gathering yokes are embedded in the casing; and hence variation in outputs of the Hall IC 30, occurring due to temperature, can be suppressed, allowing the output characteristics of the rotation angle sensor 1 to be improved. Furthermore, because the magnetic flux gathering yokes 40 are not completely embedded in the casing 50 and the number of parts to be embedded therein is small, the number of portions that need strict dimensional control becomes small. Therefore, the number of production processes of the rotation angle sensor 1 is reduced, contributing to cost reduction.

Further, the diameter-reduced portion 51e is formed on the inner circumferential surface of the outer circumferential wall 51a of the casing body 51. The diameter-reduced portion 51e is designed such that the spaced distance between the diameter-reduced portion 51e and the guide tube 54 is slightly smaller than the width W2 of the magnetic flux gathering yokes 40, and the yokes 40 can be light press fitted between the guide tube 54 and the diameter-reduced portion 51e. With this structure, the magnetic flux gathering yokes 40 are fixed to the outer circumferential surface 54a of the guide tube 54 without a clearance by being biased toward the guide tube 54 side by the diameter-reduced portion 51e, and hence the spaced distance C between the ring-shaped permanent magnet 20 and the magnetic flux gathering yokes 40 can be kept constant over the whole circumferential direction. Accordingly, an amount of magnetic fluxes turning into the magnetic flux gathering yokes 40 can be stabilized, allowing the rotation angle sensor 1 to provide excellent output characteristics. Further, even when the casing body 51 contracts, there is no fear that the spaced distance C between the ring-shaped permanent magnet 20 and the magnetic flux gathering yokes 40 may be drastically varied due to instant movement of the yokes 40 in the direction away from the guide tube 54, because there is a margin in a contraction allowance of the diameter-reduced portion 51e as much as the yokes 40 are light press fitted. Furthermore, even when the casing body 51 slightly contracts due to repetition of the expansion and the contraction, the magnetic flux gathering yokes 40 are not spaced apart from the guide tube 54 before the diameter-reduced portion 51e contracts in excess of the aforementioned margin in the contraction allowance, allowing the durability of the rotation angle sensor 1 to be improved. Herein, because the magnetic flux gathering yokes 40 are biased toward the guide tube 54 side by the diameter-reduced portion 51e, the guide tube 54 is always subjected to stress from the yokes 40. When the guide tube 54 is made of a material having a high stiffness such as PPS and PEEK, the thickness Ls in the radial direction of the guide tube 54 can be made thin in accordance with the stiffness. In this case, because the spaced distance C between the ring-shaped permanent magnet 20 and the magnetic flux gathering yokes 40 is smaller, a larger amount of magnetic fluxes pass through the yokes 40, allowing the rotation angle sensor 1 to provide excellent output characteristics.

Furthermore, the guide tube 54 is made of a non-magnetic material such that the magnetic flux does not turn in the guide tube 54, and therefore an amount of magnetic fluxes passing through the magnetic flux gathering yokes 40 is stabilized, allowing the rotation angle sensor 1 to provide excellent output characteristics.

Further, the Hall ICs 30 are designed to be arranged in the gaps 43 and 44 formed by dividing the ring-shaped yoke into two pieces along a diametrical line. With this structure, the gaps 43 and 44 are located at 180° positions in the circumferential direction; and hence signal outputs, each having the same phase or the opposite phase with each other, can be produced if necessary, when the Hall IC 30 is arranged in each of the gaps 43 and 44. Further, because a rotation angle is detected based on the outputs of the Hall ICs 30 arranged in each of the gaps 43 and 44, detection accuracy of the rotation angle sensor 1 can be improved.

In the aforementioned embodiment, the case where the guide tube 54 is made of a resin material has been described; however, the guide tube may be made of a non-ferrous metal material such as aluminum (linear expansion coefficient: 2.3× $10^{-5}$/° C.), copper (linear expansion coefficient: 1.7×$10^{-5}$/° C.) and stainless steel (linear expansion coefficient: 1.7× $10^{-5}$/° C.), as far as the material is not affected by magnetism and has high a strength. These non-ferrous metal materials are excellent in processability and capable of easily forming the guide tube 54, the thickness W3 of which is thin in the radial direction and uniform over the whole circumference in the circumferential direction. A guide tube made of such a non-ferrous metal material is not brittle even when the thickness W3 in the radial direction is thin as compared to a guide tube made of a resin material having a high stiffness, and hence a guide tube excellent in durability can be obtained.

Herein, among the aforementioned non-ferrous metal materials, because aluminum and stainless steel have small linear expansion coefficients, respectively, the extent of the expansion or the contraction of a guide tube made of aluminum or stainless steel, occurring due to temperature, is smaller than that of a guide tube made of a resin material. Accordingly, in the guide tube made of aluminum or stainless steel, the spaced distance C between the ring-shaped permanent magnet 20 and the magnetic flux gathering yokes 40 can be kept roughly constant as compared to the case where the guide tube made of a resin material is adopted. Furthermore, variation in the gaps 43 and 44 between the magnetic flux gathering yokes 40, occurring due to temperature, can be suppressed. When a guide tube with a cylindrical shape is made of a non-ferrous metal material, the guide tube can be one having an excellent countervailing power against distortion; and hence the guide tube is not greatly distorted after the distortion of the casing 50 even if the casing 50 is subjected to the distortion. Therefore, also in this case, the spaced distance C between the ring-shaped permanent magnet 20 and the magnetic flux gathering yokes 40 can be kept roughly constant, allowing variation in the spaced distance of the gaps 43 and 44 to be suppressed.

Further, even if the guide tube 54 moves inside the casing 50 due to the expansion or the contraction of the casing 50, the magnetic flux gathering yokes 41 and 42 move integrally with the guide tube 54 because the yokes 41 and 42 are fixed to the outer circumferential surface 54a of the guide tube 54 in which deformation hardly occurs. Therefore, at least the spaced distance of the gaps 43 and 44 between the magnetic flux gathering yokes 41 and 42 are kept roughly constant, allowing the output characteristics of the rotation angle sensor 1 not to be greatly affected.

Figure 5:
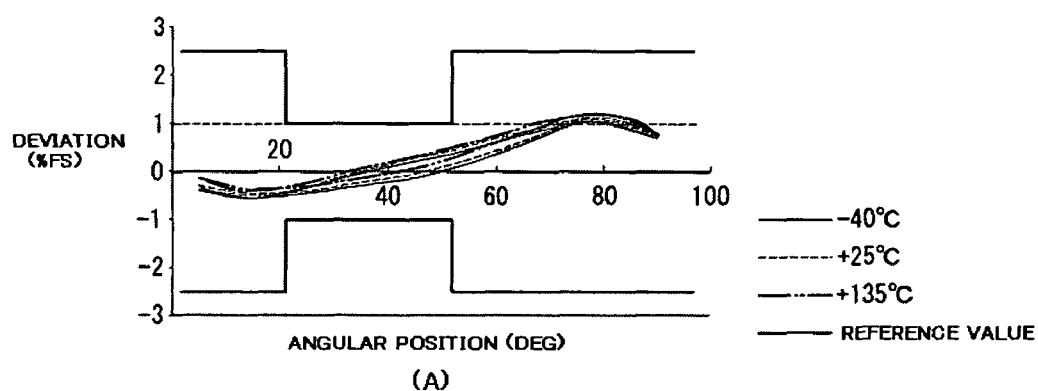
FIGS. 5A and 5B are graphs illustrating output characteristics of the rotation angle sensors according to the embodiment and the conventional example.
Figure 5:
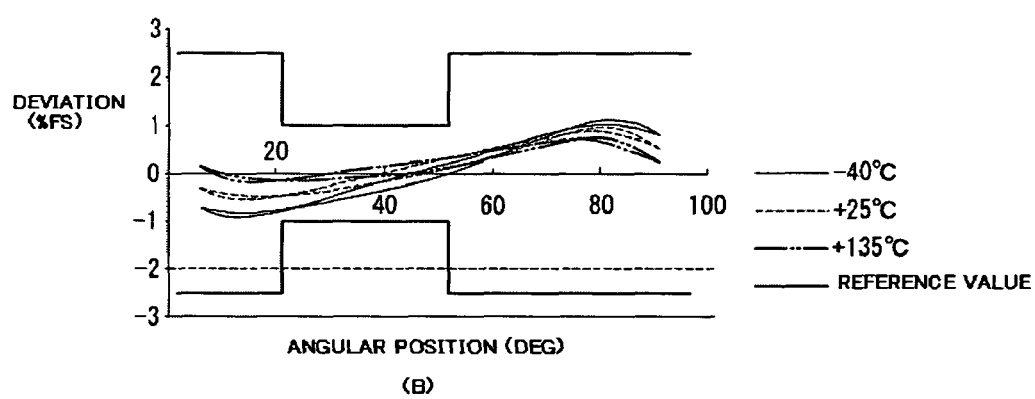

FIGS. 5A and 5B are graphs illustrating the output characteristics (non-linearity) of: the rotation angle sensor according to the embodiment in which the magnetic flux gathering yokes 40 are fixed to the outer circumferential surface 54a of the guide tube 54 made of aluminum illustrated in FIGS. 4A and 4B; and the rotation angle sensor according to the conventional example in which the magnetic flux gathering yokes are embedded in a resin material forming the casing body.

Herein, referring to FIG. 3B, the position of the ring-shaped permanent magnet 20 is a rotation angle of 0° in FIGS. 5A and 5B when a line (a linear line Y perpendicular to a line X connecting opposing faces of each end of the magnetic semicircle portions 21 and 22) connecting N pole and S pole of the ring-shaped permanent magnet 20 passes through each of the gaps 43 and 44 between the magnetic flux gathering yokes 41 and 42. Further, the position of the magnet 20 is a rotation angle of 100° in FIGS. 5A and 5B when the ring-shaped permanent magnet 20 is rotated 100° clockwise from the position illustrated in FIG. 3B.

In FIGS. 5A and 5B, in a detection range set within the range of 0° to 100°, a line connecting a theoretical output voltage of the Hall IC 30 when an angular position of the ring-shaped permanent magnet 20 is at the lower limit position in the detection range, and a theoretical output voltage thereof when the angular position of the Hall IC 30 is at the upper limit position in the region, is set as an ideal linear line; and non-linearity (deviation % FS) of an actual output voltage of the Hall IC to the ideal linear line at each angular position within the detection range is illustrated. Herein, FIG. 5A illustrates hysteresis, i.e., the non-linearity (% FS) at each rotation angle of the rotation angle sensor according to the embodiment, and FIG. 5B illustrates the same of the rotation angle sensor according to the conventional example.

In the rotation angle sensor according to the embodiment, roughly the same non-linearity is shown under the whole temperature environments from low temperature (−40° C.) to high temperature (+135° C.), showing no great difference among each temperature. On the other hand, in the rotation angle sensor according to the conventional example, results show that the non-linearity thereof is greatly dependent on temperature. Accordingly, it has been confirmed that the rotation angle sensor according to the embodiment provides more stable outputs without greatly being affected by temperature as compared to that of the conventional example.

As stated above, the guide tube 54 made of a non-ferrous metal material such as aluminum, copper and stainless steel can be easily formed with a thickness that is smaller than that of a guide tube made of a resin material and uniform over the whole circumferential direction. Also, a metal material has a small linear expansion coefficient and small extent of expansion or contraction due to temperature, and hence the spaced distance C between the magnetic flux gathering yokes 40 fixed to the outer circumferential surface 54a of the guide tube 54 and the ring-shaped permanent magnet 20 can be kept roughly constant over the whole circumferential direction, and the spaced distances of the gaps 43 and 44 between the magnetic flux gathering yokes 40 can also be kept roughly constant, under a temperature environment where the casing 50 is greatly expands or contracts. Therefore, a rotation angle sensor capable of providing more stable output characteristics without being affected by difference in temperature, can be obtained.

In the aforementioned embodiment, the case where the diameter-reduced portion 51e is formed over the whole circumference of the inner circumferential surface of the outer circumferential wall 51a of the casing body 51, has been exemplified. However, the diameter-reduced portion may be formed along the inner circumferential surface of the casing body 51 with a certain clearance being formed between the guide tube 54 and the diameter-reduced portion, as far as the magnetic flux gathering yokes 41 and 42 can be held between the diameter-reduced portion and the guide tube 54. Also, with this structure, the same effects as the aforementioned embodiment can be obtained. Further, because a contact area between the magnetic flux gathering yokes 40 and the casing body 51 is limited by this structure, a positional displacement of the magnetic flux gathering yokes 40, occurring due to a strain if happening in the casing body 51, can be suppressed as compared to the case where the diameter-reduced portion is formed over the whole circumference of the inner circumferential surface. Accordingly, a rotation angle sensor, output characteristics of which are hardly affected by the strain, can be obtained.

Further, the magnetic flux gathering yokes 40 may be fixed only to the guide tube 54 by an adhesive, etc., so that the yokes 40 are not in contact with the casing body 51 that is affected by outside temperature. With this structure, the spaced distance C between the ring-shaped permanent magnet 20 and the magnetic flux gathering yokes 40 can be kept roughly constant without being greatly varied even when the case 50 expands or contracts due to heat, and hence a rotation angle sensor capable of providing more stable output characteristics can be obtained.

Further, in the aforementioned embodiment, the case where the rotor and the ring-shaped permanent magnet are integrated into one-piece by forming the ring-shaped permanent magnet on the outer circumferential surface of the rotor, has been exemplified; however, it may be adopted that a rotor made of a magnetic material is magnetized such that the rotor itself has a two-pole structure having N and S in the circumferential direction as a whole.

Figure 6:
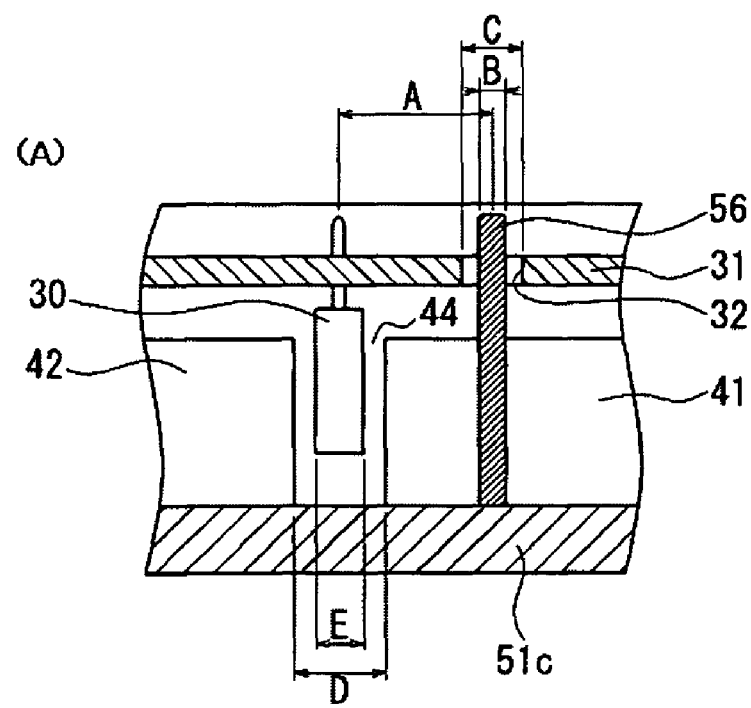
FIGS. 6A and 6B are views illustrating location of a magnetic sensitive element.
Figure 6:
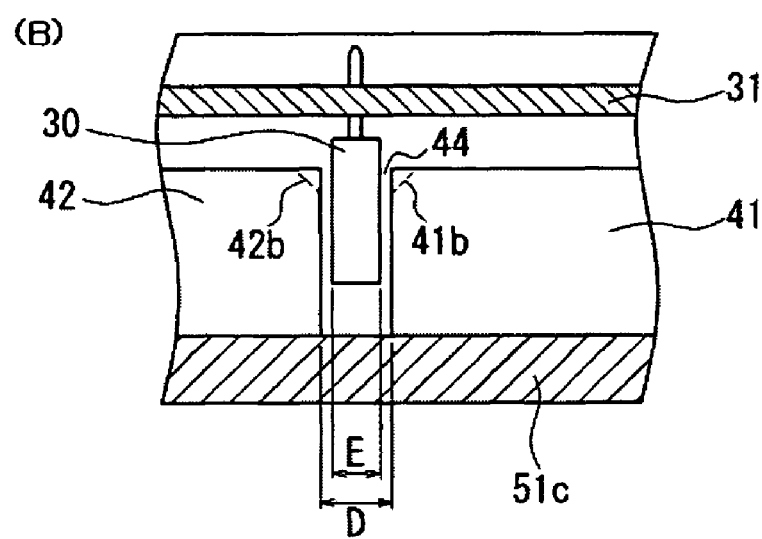
Figure 7:
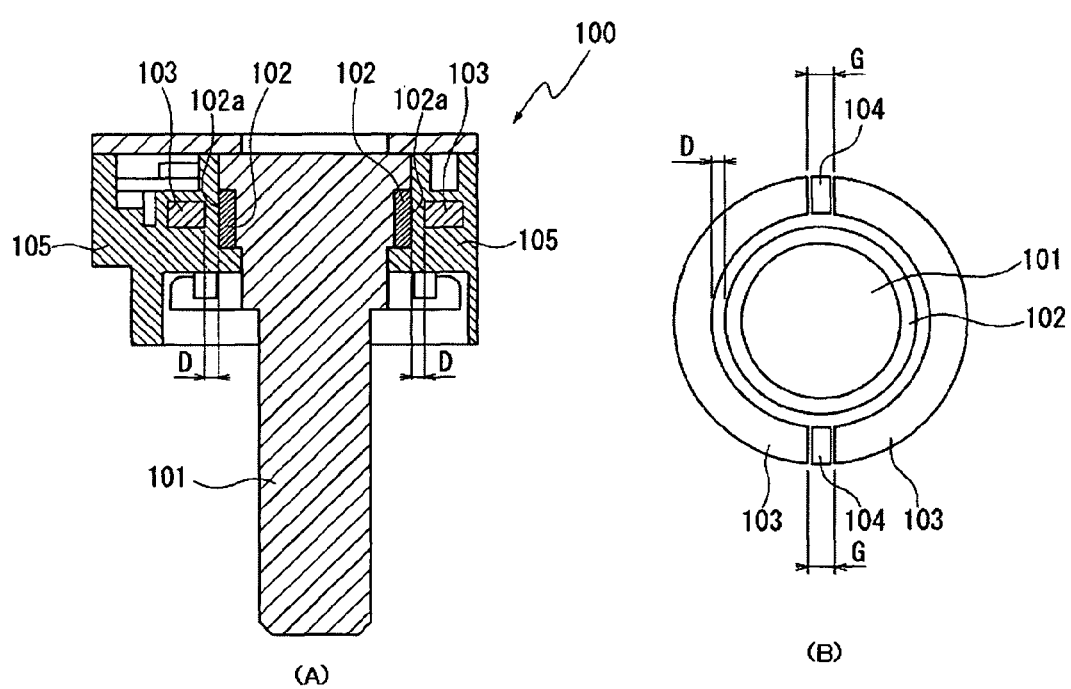
FIGS. 7A and 7B are views illustrating the rotation angle sensor according to the conventional example.

FIG. 6A is a schematic view illustrating a state of the Hall IC 30 arranged in the gap 44 between the magnetic flux gathering yokes 41 and 42 illustrated in FIG. 3B, seen from the lateral side of the casing body 51; and FIG. 6B is a view illustrating a variation thereof.

In the aforementioned embodiment, as illustrated in FIG. 3A, the Hall ICs 30 fixed to the substrate 31 are designed so as to be located in the gaps 43 and 44 between the magnetic flux gathering yokes 41 and 42 by penetrating the locating bosses 56 formed on the casing 50 side through the location holes 32 formed in the substrate 31, when mounting the substrate 31 on the casing body 51. Therefore, as illustrated in FIG. 6A, a width D of the gap 43 is determined to be larger in order for arrangement of the Hall ICs 30 in the gaps 43 and 44 not to be disturbed, in consideration for variations in diameter B of the location boss 56, diameter C of the location hole 32, distance A between the Hall IC 30 fixed to the substrate 31 and the location boss 56, thickness E of the Hall IC 30 or the like, and positional displacements of the magnetic flux gathering yokes 41 and 42.

Herein, when the guide tube 54 is made of a non-ferrous metal material having a small linear expansion coefficient, the guide tube 54 becomes one in which a strain or distortion due to deformation hardly occur. In this case, a positional displacement of the magnetic flux gathering yokes 41 and 42 fixed to the outer circumferential surface of the guide tube 54 can be suppressed. Further, because the substrate 31 has a shape fitting over the outer circumferential surface of the guide tube 54, the guide tube 54 can be used for location of the Hall IC 30.

Therefore, as illustrated in FIG. 6B, the location boss 56 and the location hole 32, which are used for the location, can be omitted. In the case, the width D of the gaps 43 and 44 between the magnetic flux gathering yokes 41 and 42 can be determined only in consideration of variations in the thickness E of the Hall IC 30 or the like, without considering the aforementioned variations in the diameter B of the location boss 56, the diameter C of the location hole 32 and the distance A between the Hall IC 30 fixed to the substrate 31 and the location boss 56.

Thereby, the width D of the gaps 43 and 44 can be set to be smaller as compared to the case where the location is determined by using the location boss 56; as a result, diffusion of magnetic forces (magnetic fluxes) passing through the magnetic flux gathering yokes 41 and 42 can be suppressed to increase the magnetic forces passing through the Hall IC 30, allowing the detection accuracy of the rotation angle sensor to be improved.

As stated above, with the structure in which the guide tube 54 is made of a non-ferrous metal material such as aluminum and the Hall IC 30 is fixed to the substrate 31 that is arranged so as to be fitted over the outer circumferential surface of the guide tube 54, the location boss 56 formed on the casing 50 side and the location hole 32 formed in the substrate 31 can be omitted.

With this, the gaps 43 and 44 between the magnetic flux gathering yokes 41 and 42 can be designed to be smaller, and hence the magnetic forces passing through the Hall ICs 30 arranged in the gaps 43 and 44 are increased, allowing the detection accuracy of the rotation angle sensor to be improved. Furthermore, the number of the production processes of the rotation angle sensor can be reduced, contributing to cost reduction.

When omitting the location boss 56 and the location hole 32, tapered surfaces 41b and 42b may be formed on the upper edge face on the cover 52 side of the magnetic flux gathering yokes 41 and 42 opposing each other across the gap, as illustrated by dotted lines in FIG. 6B, so that the Hall IC 30 is easily inserted into the gap.

What is claimed is:

1. A rotation angle sensor in which:
    a ring-shaped permanent magnet provided so as to be rotatable integrally with a member to be detected;
    ring-shaped yokes surrounding the outer circumferential surface of the ring-shaped permanent magnet with a certain clearance being formed between the outer circumferential surface and the ring-shaped yokes; and
    a magnetic sensitive element arranged in a gap formed between the ring-shaped yokes, are arranged inside a casing,
    wherein a tube-shaped wall surrounding the outer circumferential surface of the ring-shaped permanent magnet is attached to the casing, and wherein the tube-shaped wall is made of a material having a linear expansion coefficient smaller than that of the casing and the ring-shaped yokes are fixed to the outer circumferential surface of the tube-shaped wall.

2. The rotation angle sensor according to claim 1, wherein a diameter-reduced portion is formed on the inner circumferential surface of the outer circumferential wall of the casing and the ring-shaped yokes are fitted between the tube-shaped wall and the diameter-reduced portion.

3. The rotation angle sensor according to claim 1, wherein the tube-shaped wall is made of a non-magnetic material.

4. The rotation angle sensor according to claim 1, wherein the tube-shaped wall is made of a non-ferrous metal material.

5. The rotation angle sensor according to claim 1, wherein the magnetic sensitive element is arranged in a gap formed by the ring-shaped yoke being divided into two pieces along a diametrical line.

6. The rotation angle sensor according to claim 2, wherein the tube-shaped wall is made of a non-magnetic material.

7. The rotation angle sensor according to claim 2, wherein the tube-shaped wall is made of a non-ferrous metal material.

8. The rotation angle sensor according to claim 2, wherein the magnetic sensitive element is arranged in a gap formed by the ring-shaped yoke being divided into two pieces along a diametrical line.

9. The rotation angle sensor according to claim 3, wherein the magnetic sensitive element is arranged in a gap formed by the ring-shaped yoke being divided into two pieces along a diametrical line.

10. The rotation angle sensor according to claim 4, wherein the magnetic sensitive element is arranged in a gap formed by the ring-shaped yoke being divided into two pieces along a diametrical line.

* * * * *